(12) United States Patent
Karch et al.

(10) Patent No.: US 9,262,310 B2
(45) Date of Patent: Feb. 16, 2016

(54) METHODS, APPARATUSES AND COMPUTER PROGRAM PRODUCTS FOR BULK ASSIGNING TESTS FOR EXECUTION OF APPLICATIONS

(71) Applicant: United Parcel Service of America, Inc., Atlanta, GA (US)

(72) Inventors: Robert Joseph Karch, Frederick, MD (US); Elena Santantasio, Monroe, NY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 141 days.

(21) Appl. No.: 14/063,635

(22) Filed: Oct. 25, 2013

(65) Prior Publication Data
US 2015/0121147 A1   Apr. 30, 2015

(51) Int. Cl.
*G06F 11/36*   (2006.01)
*G06F 3/0482*   (2013.01)

(52) U.S. Cl.
CPC .......... *G06F 11/3688* (2013.01); *G06F 3/0482* (2013.01)

(58) Field of Classification Search
CPC ............ G06F 11/3688; G06F 3/04847; G06F 3/04842; G06F 11/3692; G06F 11/3457; G06F 11/3664; G06F 11/3684; G06F 11/3696; G06F 11/2294
See application file for complete search history.

(56) References Cited

U.S. PATENT DOCUMENTS

| | | | |
|---|---|---|---|
| 8,819,642 B2 * | 8/2014 | Bhat et al. | 717/130 |
| 8,893,087 B2 * | 11/2014 | Maddela | 717/124 |
| 2004/0107415 A1 * | 6/2004 | Melamed et al. | 717/124 |
| 2009/0235172 A1 * | 9/2009 | Gandhi et al. | 715/733 |
| 2010/0070231 A1 * | 3/2010 | Hanumant | 702/123 |
| 2011/0113224 A1 * | 5/2011 | Isshiki et al. | 712/240 |
| 2012/0239978 A1 * | 9/2012 | Narutani et al. | 714/32 |
| 2013/0117611 A1 * | 5/2013 | Chakraborty et al. | 714/33 |
| 2013/0174178 A1 * | 7/2013 | Chakraborty et al. | 718/105 |
| 2013/0311976 A1 * | 11/2013 | Bhat et al. | 717/130 |

* cited by examiner

*Primary Examiner* — Nadeem Iqbal
(74) *Attorney, Agent, or Firm* — Alston & Bird LLP

(57) ABSTRACT

An apparatus is provided for facilitating bulk assignment of test cases to a test cycle. The apparatus may include at least one memory and at least one processor configured to enable selection, via a user interface, of test cases to assign the test cases to a designated test cycle. The test cases are designated for testing or execution of functions of at least one application. The processor is also configured to automatically calculate an estimated duration of time in which to complete the testing or execution of the functions in response to receipt of indications of selections of the test cases via the user interface. The processor is also configured to provide visible indicia in the user interface indicating the estimated duration of time in which to complete the testing or the execution of the functions of the application. Corresponding computer program products and methods are also provided.

18 Claims, 19 Drawing Sheets

---

Enable selection, via a user interface, of a plurality of test cases to assign the test cases to a designated test cycle, the test cases are designated for testing or execution of one or more functions of at least one application — 2100

Automatically calculate an estimated duration of time in which to complete the testing or the execution of the functions in response to receipt of indications of selections of the test cases via the user interface — 2105

Provide visible indicia in the user interface indicating the estimated duration of time in which to complete the testing or the execution of the functions of the application(s) — 2110

| List Box Name | Description |
|---|---|
| Test Cycle | The cycle you are creating assignments for |
| Assigned To | Tester ID who will be assigned the test cases |
| Operating system | Operating system that the test cases should be run on |
| Application language | Language of the application that the test cases should be run on |
| OS Language | Operating system language that the test cases should be run on |
| Origin Country | Origin country that the test cases should be run on |

FIG. 9A

| Command Button Name | Description |
|---|---|
| Cancel | Closes the Create Assignments dialog without making any changes |
| Reset | Clears any selections made on the Create Assignments dialog |
| Create Assignments | Creates the Assignments, sends data to the Pending Assignments Grid |

FIG. 9B

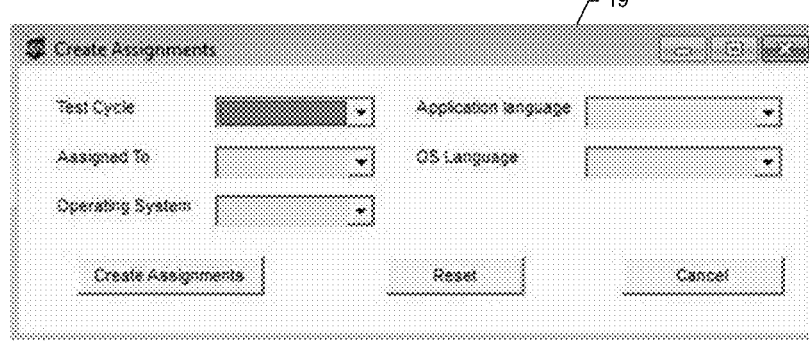

FIG. 10

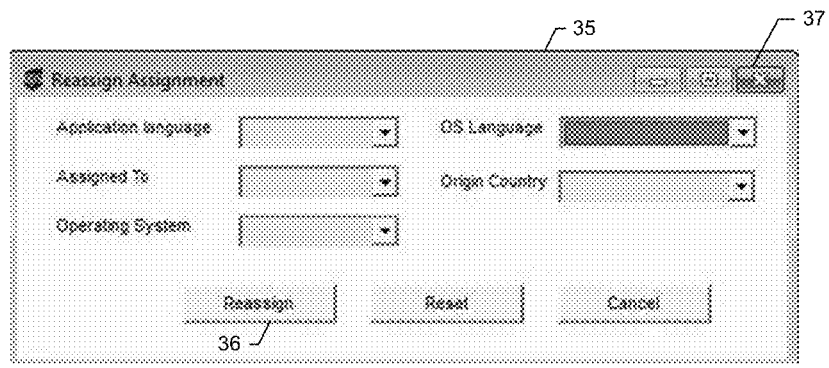

FIG. 17

| List Box Name | Description |
|---|---|
| Application language | Language of the application that the test cases should be run on |
| Assigned To | Tester ID who will be assigned the test cases |
| Operating System | Operating system that the test cases should be run on |
| OS Language | Operating system language that the test cases should be run on |
| Origin Country | Origin country that the reassigned test cases should be run on |

FIG. 18A

| Command Button Name | Description |
|---|---|
| Cancel | Closes the Reassign Assignment dialog without making any changes |
| Reset | Clears any selections made on the Reassign Assignment dialog |
| Reassign | Reassigns the assignments with the selected options |

FIG. 18B

| Test Case Management Tasks | Conventional Test Case Management Applications | QC Customization Module | Time Saved |
|---|---|---|---|
| Create test case execution assignments per cycle (average 1200 – 1300) | 8-10 days | 4-5 days | 4-5 days |
| Reassign test case execution assignments to another resource (average 5 x per cycle) | 10 min (per request) x 5 = (50 min) | 1 min (per request) x 5 = (5 min) | 45 min (90% effort reduced) |
| Locating duplicate assignments in same or different test set cycles after all cycle assignments are completed | 2-3 hours | 10 -15 min | 2+ hours |

FIG. 20

METHODS, APPARATUSES AND COMPUTER PROGRAM PRODUCTS FOR BULK ASSIGNING TESTS FOR EXECUTION OF APPLICATIONS

TECHNOLOGICAL FIELD

Exemplary embodiments of the invention relate generally to methods, apparatuses and computer program products for application test management and more particularly relates to a mechanism of assigning tests in bulk for execution of applications.

BACKGROUND

Currently, test case management applications configured to manage testing processes for execution of applications suffers from many drawbacks. For example, at present, test case management applications, such as for example the Hewlett Packard™ (HP) Quality Center (QC) test case management tool, are lacking in facilitating test execution assignments that are capable of bulk assigning test cases to a pre-defined configuration setup which oftentimes presents problems due to the amount of resource time that may be needed to setup testing cycles.

For instance, on average 1,200-1,300 test cases may be assigned for a given test cycle that lasts on average 10 days. Currently, existing test case management applications lack a bulk assign feature for assigning multiple test cases for applications and as such may take twice as long (e.g., 8-10 days) as desired or necessary to complete all application testing assignments. The testing process typically involves a Test Lead to begin creating test assignments a week before the start of a next testing cycle. As such, in an instance in which there may be continuous test cycles occurring without a break, a Test Lead may not have sufficient time to complete assignments due to the inordinate amount of time needed for assigning the test cases which may cause the actual testing of the applications to start later than planned or desired.

In addition, at present, the interface in some test case management applications that allows a Test Lead to make assignments may pose usability problems by not providing full visibility of test case properties in a single easy to view screen. This may cause incompatible or missed assignments in which a test case assigned may not match an intended test strategy, which may result in unnecessary reconciliation of errors.

In view of the foregoing drawbacks, it may be beneficial to provide an efficient and reliable mechanism for bulk assigning tests for execution of applications.

BRIEF SUMMARY

A method, apparatus and computer program product are therefore provided for managing testing processes of applications and assigning test cases in bulk for execution. As such, the exemplary embodiments may facilitate bulk assigning of test cases for applications in an acceptable time frame.

In this regard, the exemplary embodiments may provide an assignment mechanism to ensure that completion of testing assignments are capable of being performed within a shorter time frame (e.g., 4-5 days) than a time period for existing test case management applications (e.g., 8-10 days).

In addition, the exemplary embodiments may facilitate filtering of test cases based on selection criteria and may facilitate updating of test cases. Furthermore, the exemplary embodiments may facilitate bulk assigning test cases as well as reassigning of test cases.

The exemplary embodiments may also facilitate management of test case cycle assignments and may provide user interfaces for viewing test cases and assignments of test cases designated for a test cycle.

In one example embodiment, a method is provided for facilitating bulk assignment of test cases to a test cycle. The method may include enabling selection, via a user interface, of a plurality of test cases to assign the test cases to a designated test cycle. The test cases may be designated for testing or execution of one or more functions of at least one application. The method may further include automatically calculating an estimated duration of time in which to complete the testing or the execution of the functions in response to receipt of indications of selections of the test cases via the user interface. The method may further include providing visible indicia in the user interface indicating the estimated duration of time in which to complete the testing or the execution of the functions of the application.

In another example embodiment, an apparatus is provided for facilitating bulk assignment of test cases to a test cycle. The apparatus may include a processor and a memory including computer program code. The memory and computer program code are configured to, with the processor, cause the apparatus to at least perform operations including enabling selection, via a user interface, of a plurality of test cases to assign the test cases to a designated test cycle. The test cases may be designated for testing or execution of one or more functions of at least one application. The memory and computer program code are also configured to, with the processor, cause the apparatus to automatically calculate an estimated duration of time in which to complete the testing or the execution of the functions in response to receipt of indications of selections of the test cases via the user interface. The memory and computer program code are also configured to, with the processor, cause the apparatus to provide visible indicia in the user interface indicating the estimated duration of time in which to complete the testing or the execution of the functions of the application.

In yet another example embodiment, a computer program product is provided for facilitating bulk assignment of test cases to a test cycle. The computer program product includes at least one computer-readable storage medium having computer-executable program code instructions stored therein. The computer-executable program code instructions may include program code instructions configured to enable selection, via a user interface, of a plurality of test cases to assign the test cases to a designated test cycle. The test cases may be designated for testing or execution of one or more functions of at least one application. The computer program product may further include program code instructions configured to automatically calculate an estimated duration of time in which to complete the testing or the execution of the functions in response to receipt of indications of selections of the test cases via the user interface. The computer program product may further include program code instructions configured to provide visible indicia in the user interface indicating the estimated duration of time in which to complete the testing or the execution of the functions of the application.

BRIEF DESCRIPTION OF THE SEVERAL VIEWS OF THE DRAWINGS

Figure 1:
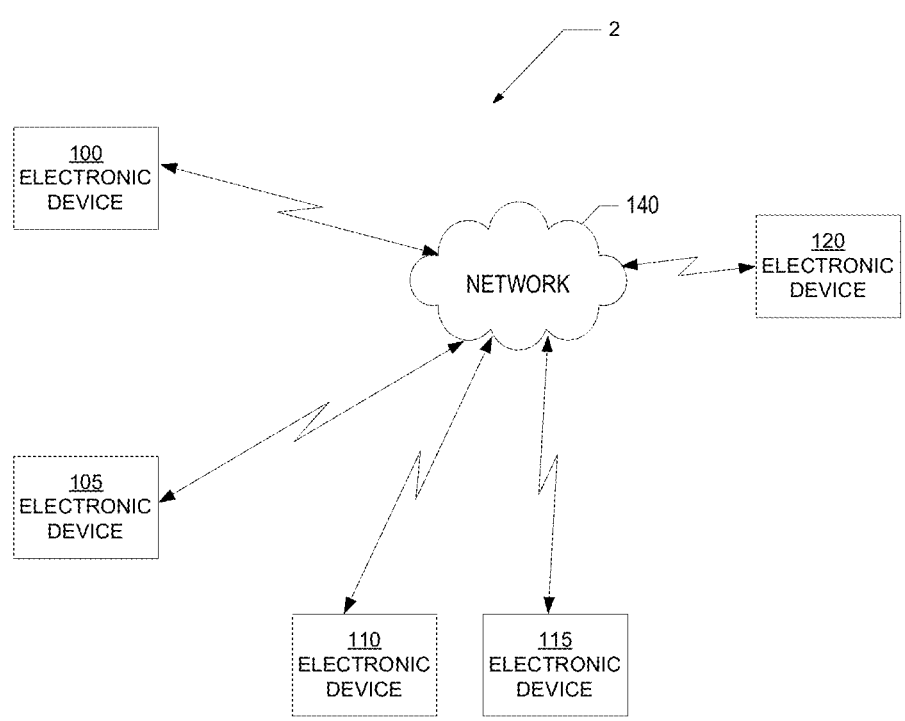
Figure 2:
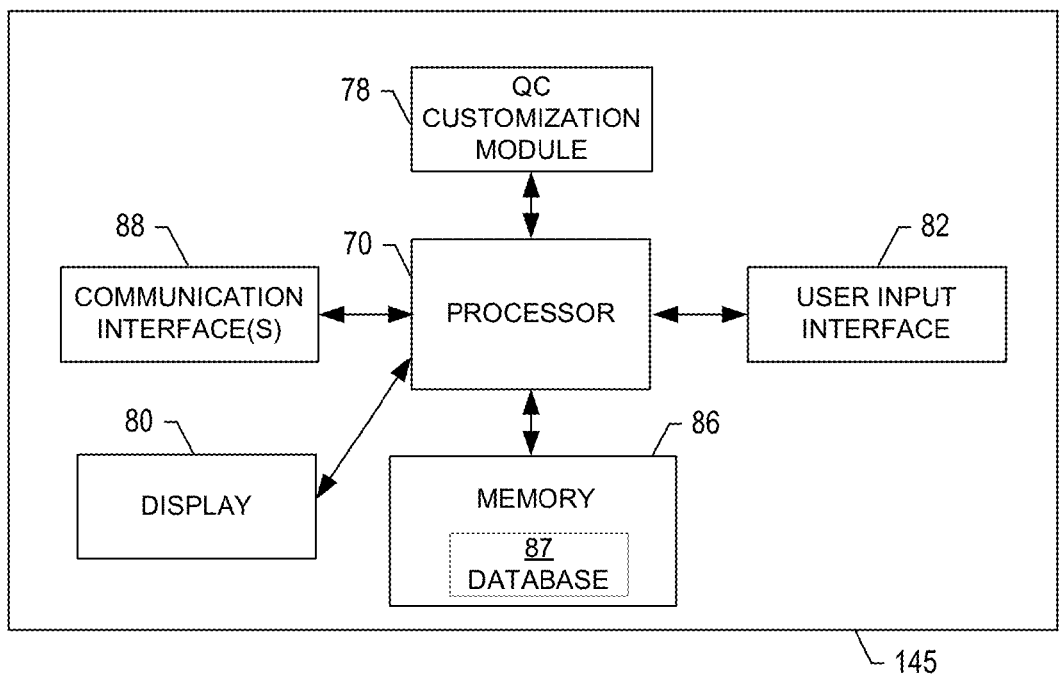
Figure 3:
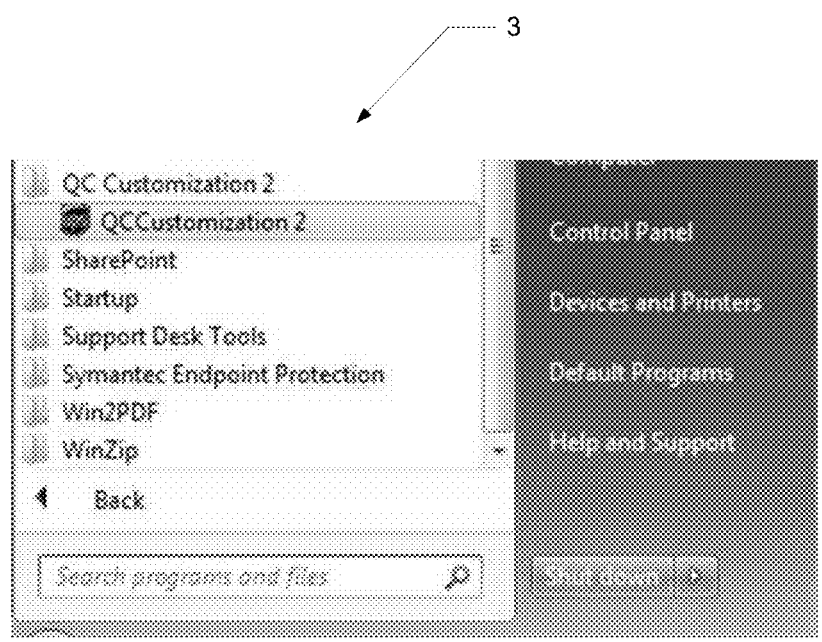
Figure 4:
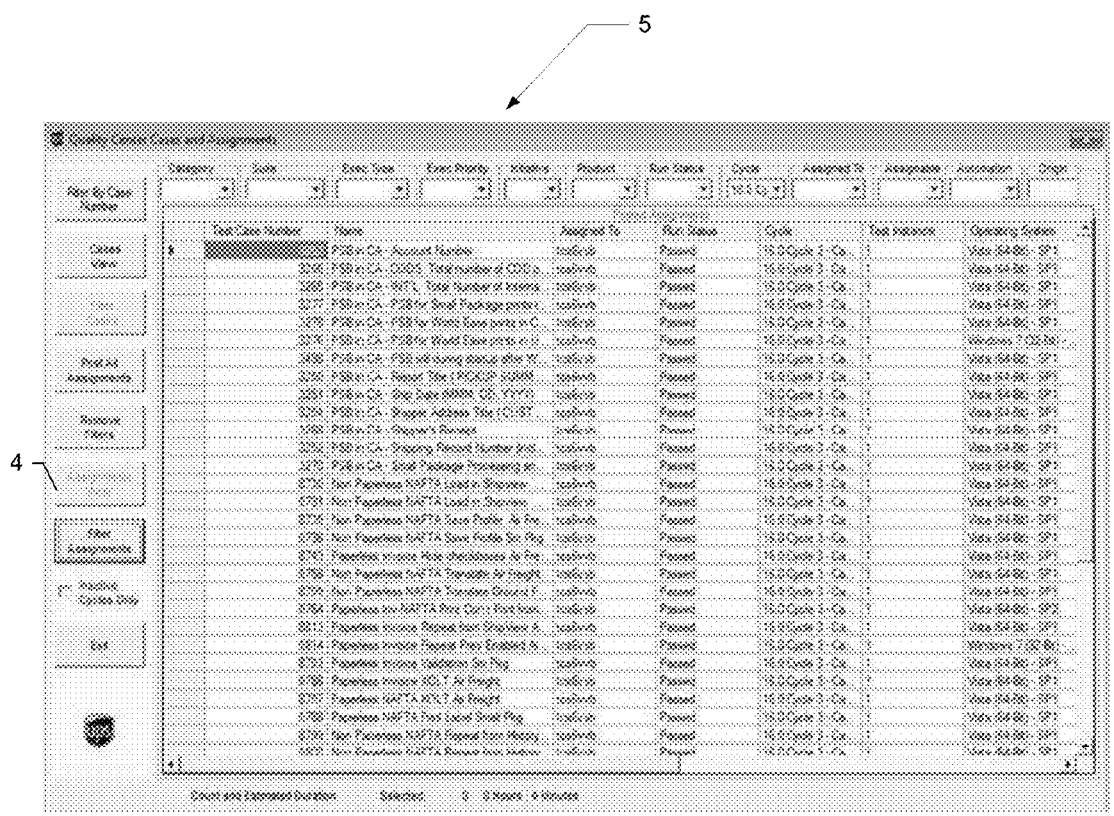
Figure 5:
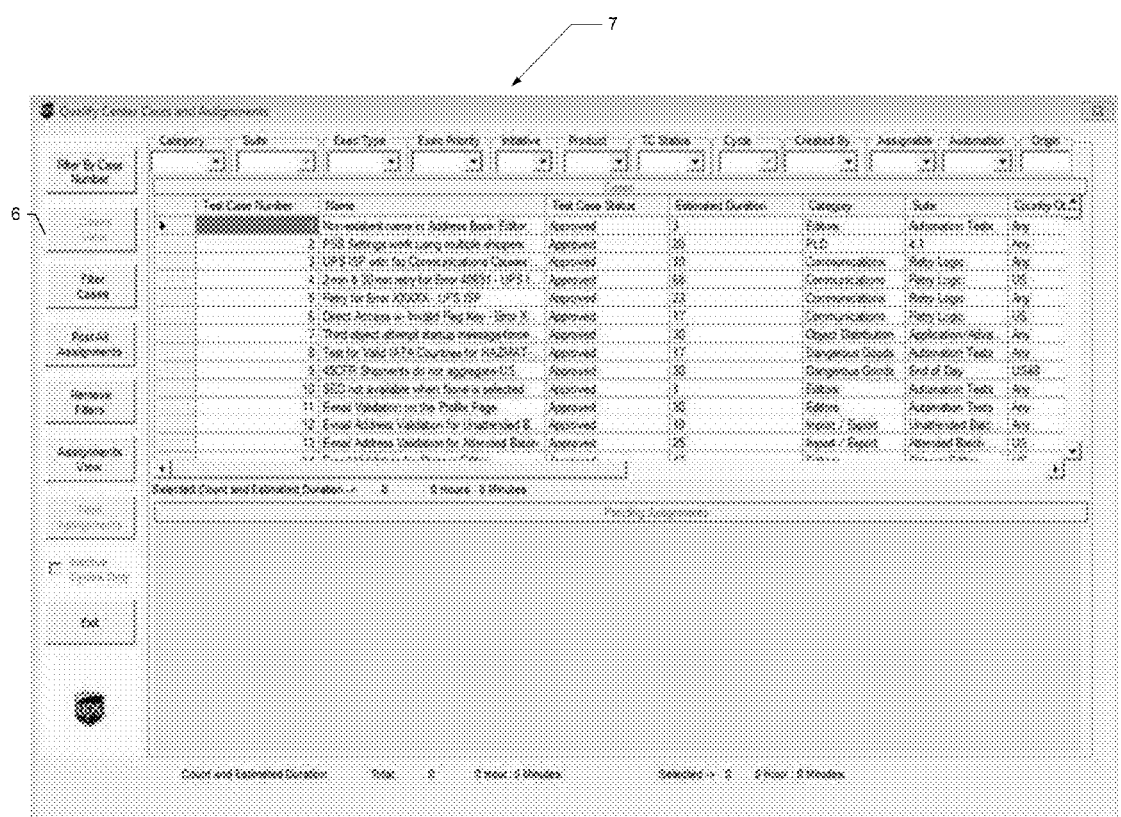
Figure 6:
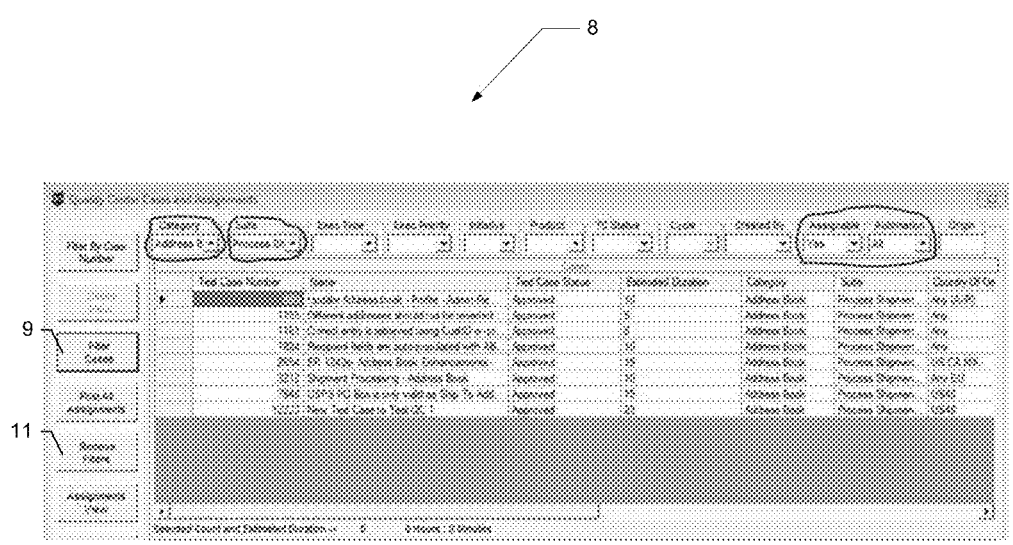
Figure 7:
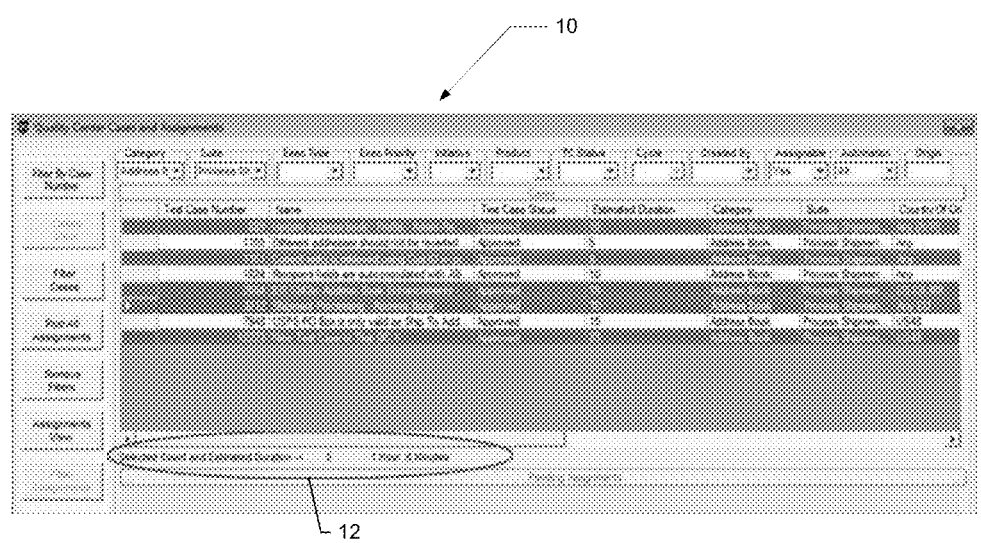
Figure 8:
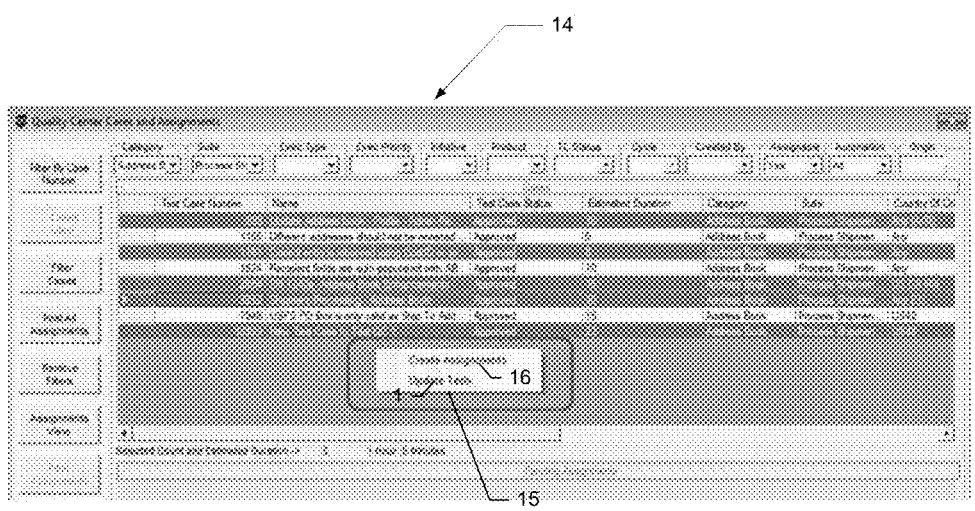
Figure 11:
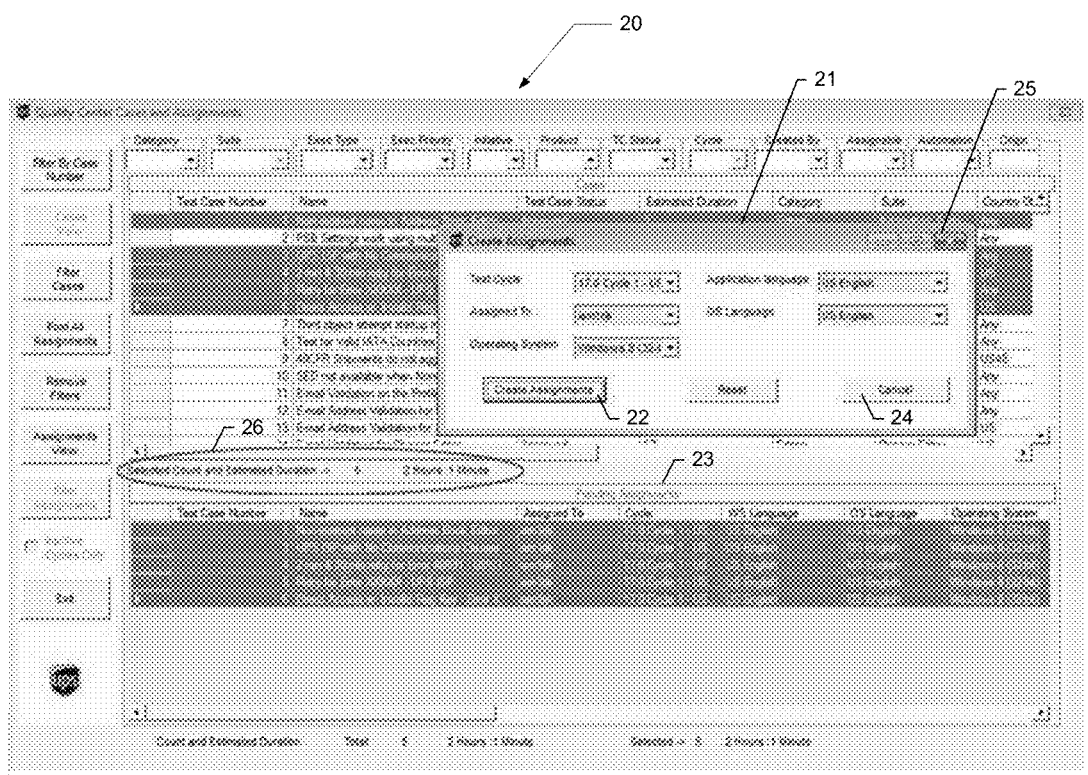
Figure 12:
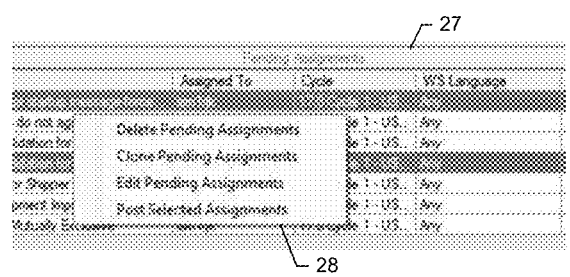
Figure 13:
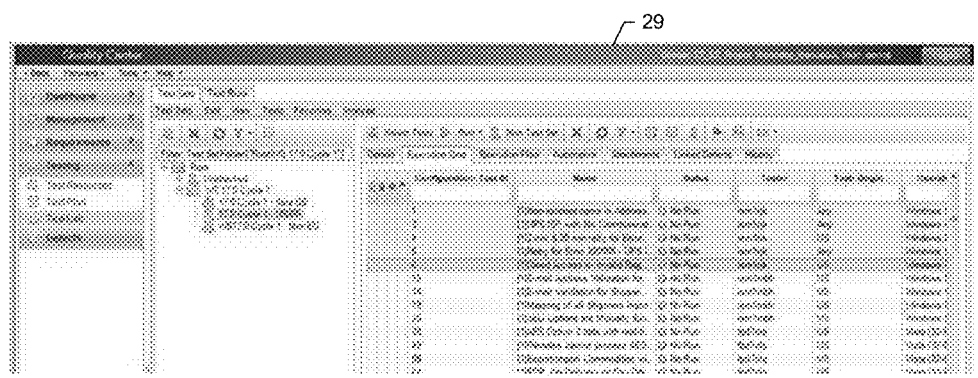
Figure 14:
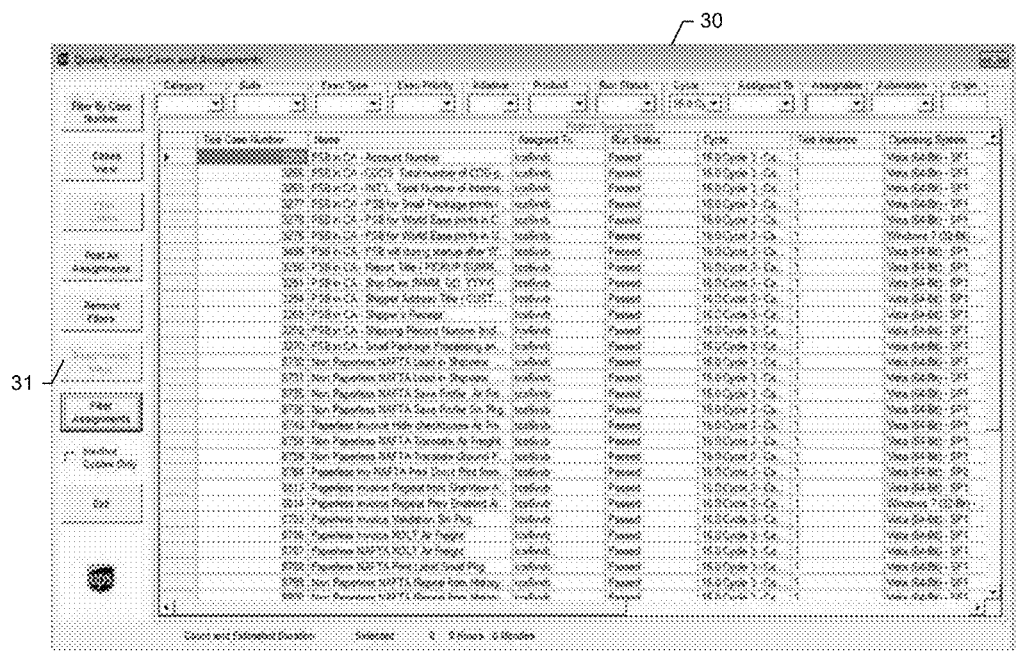
Figure 15:
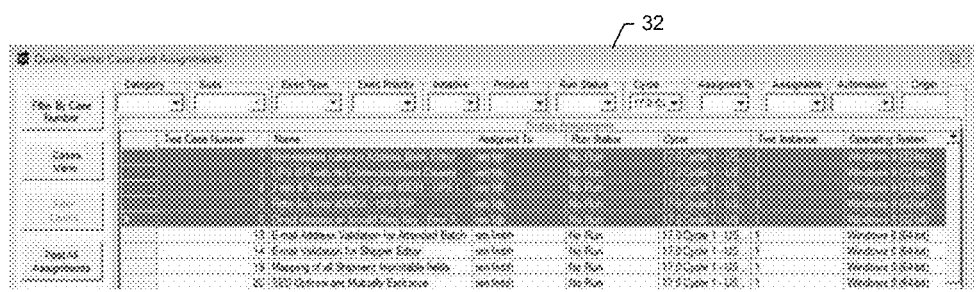
Figure 16:
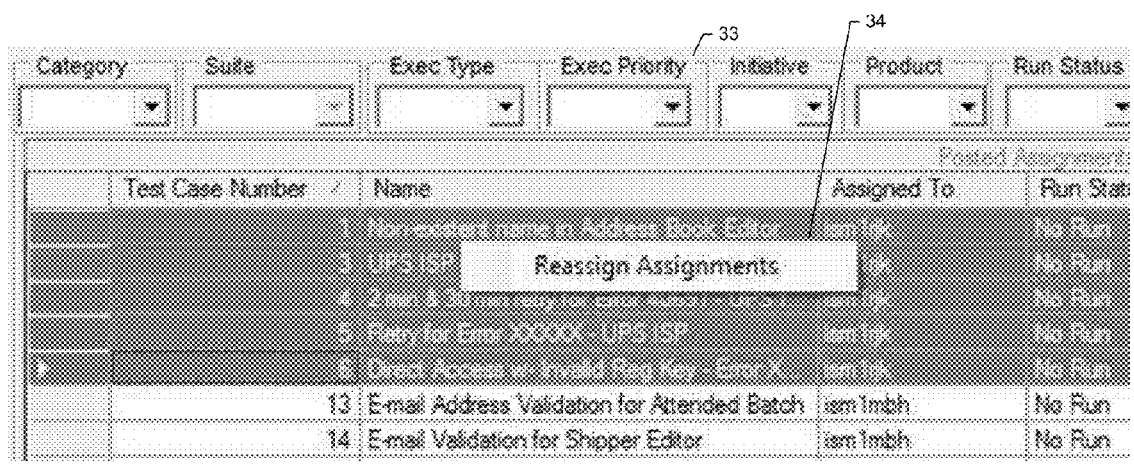
Figure 19:
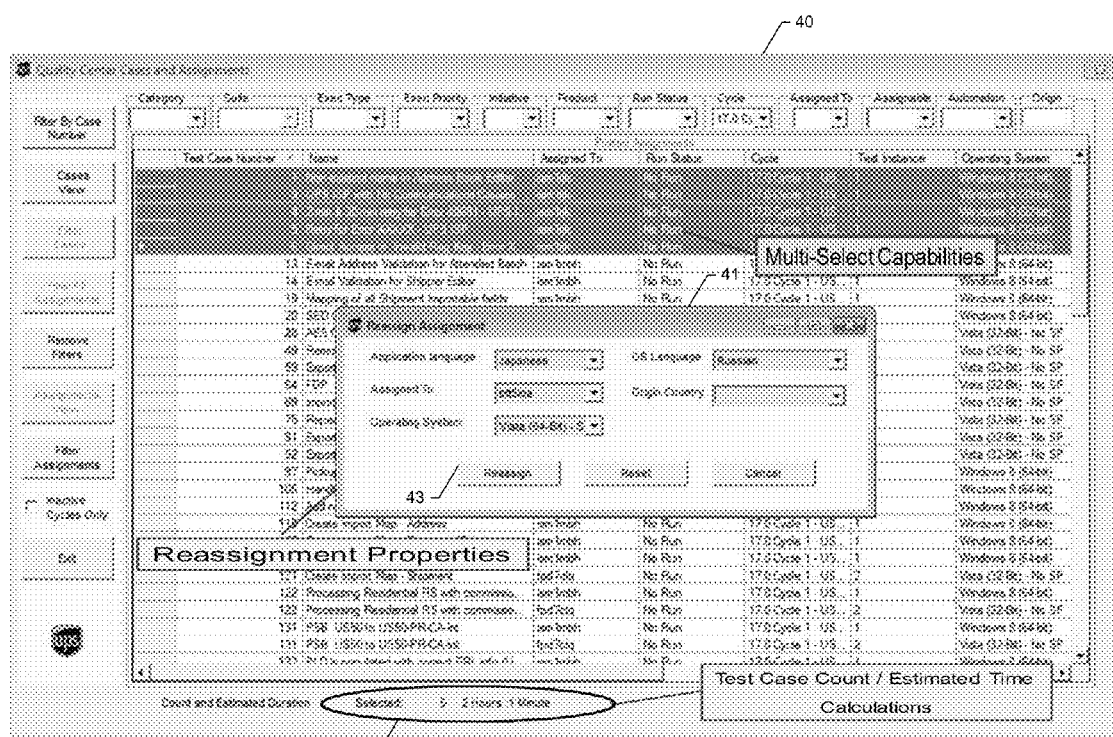
Figure 21:
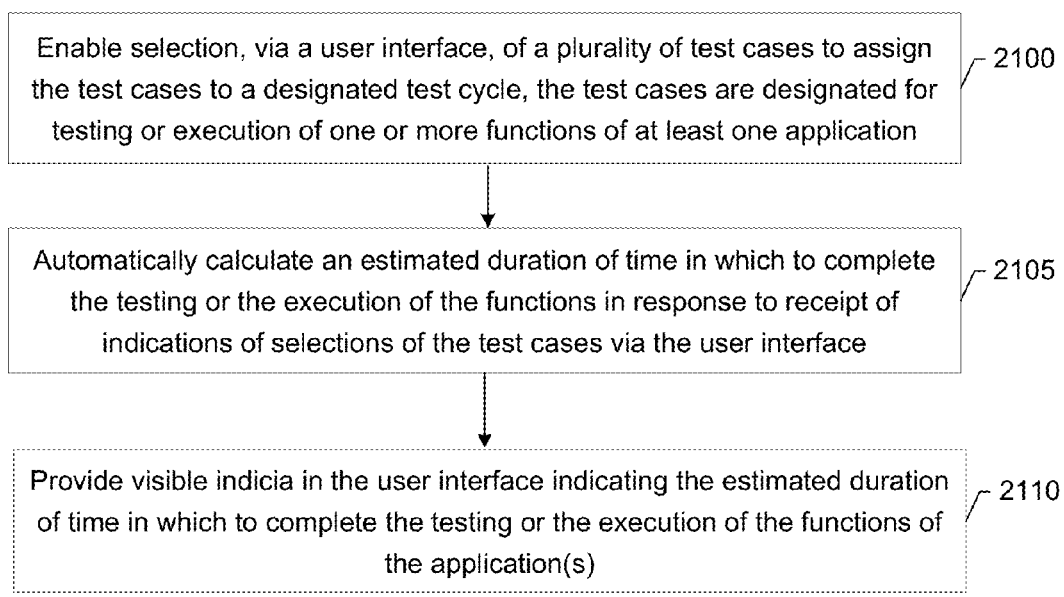

Having thus described the invention in general terms, reference will now be made to the accompanying drawings, which are not necessarily drawn to scale, and wherein:

FIG. 1 is a schematic block diagram of a system according to an exemplary embodiment of the invention;

FIG. 2 is a schematic block diagram of a communication device according to an exemplary embodiment of the invention;

FIG. 3 is a diagram illustrating a quality center customization user interface according to an exemplary embodiment of the invention;

FIG. 4 is a diagram illustrating a quality center cases and assignments user interface in an assignments view according to an exemplary embodiment of the invention;

FIG. 5 is a diagram illustrating a quality center cases and assignments user interface in a cases view according to an exemplary embodiment of the invention;

FIG. 6 a diagram illustrating a quality center cases and assignments user interface for selecting one or more test cases according to an exemplary embodiment of the invention;

FIG. 7 is a diagram illustrating a quality center cases and assignments user interface for assigning test cases according to an exemplary embodiment of the invention;

FIG. 8 is a diagram illustrating a quality center cases and assignments user interface for creating assignments according to an exemplary embodiment of the invention;

FIG. 9A is a diagram illustrating a table indicating list boxes of a create assignments dialog according to an exemplary embodiment of the invention;

FIG. 9B is a diagram illustrating a table indicating command buttons of a create assignments dialog according to an exemplary embodiment of the invention;

FIG. 10 is a diagram illustrating a create assignments dialog according to an exemplary embodiment of the invention;

FIG. 11 is a diagram illustrating a user interface for selection options to create assignments according to an exemplary embodiment of the invention;

FIG. 12 is a diagram illustrating a pending assignments user interface according to an exemplary embodiment of the invention;

FIG. 13 is a diagram illustrating a quality center test lab execution user interface according to an exemplary embodiment of the invention;

FIG. 14 is a diagram illustrating a quality center cases and assignments user interface according to an exemplary embodiment;

FIG. 15 is a diagram illustrating a user interface for reassigning one or more test cases according to an exemplary embodiment of the invention;

FIG. 16 is a diagram illustrating another user interface for reassigning one or more test cases according to an exemplary embodiment of the invention;

FIG. 17 is a reassign assignments dialog according to an exemplary embodiment of the invention;

FIG. 18A is a diagram illustrating a table including list box names and corresponding descriptions according to an exemplary embodiment of the invention;

FIG. 18B is a diagram illustrating a table including command button names and corresponding descriptions according to an exemplary embodiment of the invention;

FIG. 19 is a diagram illustrating a user interface and a reassign assignments dialog according to an exemplary embodiment;

FIG. 20 is a diagram illustrating time savings gains according to an exemplary embodiment of the invention; and FIG. 21 illustrates a flowchart of an exemplary method for facilitating bulk assignment of test cases to a test cycle according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, the term "bulk" may refer to assigning multiple tests (e.g., more than one test case (e.g., two tests cases, three test cases, etc.) for execution of one or more applications.

As referred to herein, "tests", "test cases" and similar terms may be used interchangeably to refer to testing functions or execution of one or more applications (e.g., software applications).

General System Architecture

Reference is now made to FIG. 1, which is a block diagram of a system according to exemplary embodiments. As shown in FIG. 1, the system 2 may include one or more communication devices 100, 105, 110, 115, and 120 (e.g., personal computers, laptops, workstations, servers, personal digital assistants, smart devices and the like, etc.) which may communicate with each other over a network 140, such as a wired local area network (LAN) or a wireless local area network (WLAN), a metropolitan network (MAN) and/or a wide area network (WAN) (e.g., the Internet). In this regard, the electronic devices 100, 105, 110, 115 and 120 are capable of receiving data from and transmitting data via network 140.

In one exemplary embodiment, the electronic devices 100, 105, 110, 115, and 120 may be utilized by test managers and any other suitable users to manage and assign test cases for execution of applications (e.g., software applications).

It should be pointed out that although FIG. 1 shows five electronic devices 100, 105, 110, 115, and 120 any suitable number of electronic devices 100, 105, 110, 115, and 120 may be part of the system of FIG. 1 without departing from the spirit and scope of the invention.

Communication Device

FIG. 2 illustrates a block diagram of a communication device according to an exemplary embodiment of the invention. The communication device 145 is capable of operating as any of electronic devices 100, 105, 110, 115 and 120. In this regard, the electronic devices 100, 105, 110, 115 and 120 may comprise the elements of the communication device of FIG. 2.

The communication device 145 includes various means for performing one or more functions in accordance with exemplary embodiments of the invention, including those more particularly shown and described herein. It should be understood, however, that one or more of the communication devices may include alternative means for performing one or more like functions, without departing from the spirit and scope of the invention. More particularly, for example, as shown in FIG. 2, the communication device 145 may include a processor 70 connected to a memory 86. The memory may comprise volatile and/or non-volatile memory, and typically stores content (e.g., media content), data, information or the like.

For example, the memory 86 may store content transmitted from, and/or received by, other communication devices (e.g., electronic devices 100, 105, 110, 115, and 120). In this regard, in an exemplary embodiment, the memory 86 may store data received from various disparate sources. In addition, the memory 86 may store a database 87 (also referred to herein as quality center database 87) that may include test cases and assignments of test cases designated for corresponding test cycles.

Also for example, the memory 86 typically stores client applications (e.g., C++ applications, etc.), instructions, algorithms or the like for execution by the processor 70 to perform steps associated with operation of the communication device 145 in accordance with embodiments of the invention. As explained below, for example, the memory 86 may store one or more client applications such as for example software (e.g., software code also referred to herein as computer code).

The processor 70 may be embodied in a variety of ways. For instance, the processor 70 may be embodied as a controller, coprocessor, microprocessor of other processing devices including integrated circuits such as, for example, an application specific integrated circuit (ASIC), a field programmable gate array (FPGA). In an exemplary embodiment, the processor may execute instructions stored in the memory 86 or otherwise accessible to the processor 70.

The communication device 145 may include one or more logic elements for performing various functions of one or more client applications. In an exemplary embodiment, the communication device 145 may execute the client applications. The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the communication device is capable of communicating with other communication devices (e.g., electronic devices 100, 105, 110, 115, 120) over one or more networks (e.g., network 140) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an exemplary embodiment, the processor 70 may be in communication with and may otherwise control a quality center (QC) customization module 78. The QC customization module 78 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the QC customization module 78, as described below. In examples in which software is employed, a device or circuitry (e.g., processor 70 in one example) executing the software forms the structure associated with such means. As such, for example, the QC customization module 78 may be configured to, among other things, bulk assign test cases for execution of applications in an acceptable time frame, as described more fully below.

Exemplary System Operation

Exemplary embodiments of the invention may provide an efficient and reliable mechanism for bulk assigning test cases to a predefined configuration in an acceptable time frame to minimize the amount of time needed to setup testing cycles.

Referring now to FIG. 3, a diagram illustrating a quality center customization user interface according to an example embodiment is provided. In the example embodiment of FIG. 3, the QC customization module 78 may launch the QC customization interface 3 in response to receipt of an indication of a selection of a QC customization program (e.g., QCCustomization 2) from a QC customization folder (e.g., QC Customization 2).

Referring now to FIG. 4, a diagram illustrating a quality center cases and assignments user interface is provided according to an example embodiment. In the example embodiment of FIG. 4, the QC customization module 78 may generate the quality center cases and assignments user interface 5 in response to analyzing the database 87 and retrieving data identifying designated (e.g., previously designated) assignments (also referred to herein as posted assignments) of test cases. In one example embodiment of FIG. 4, the QC customization module 78 may generate the quality center cases and assignments user interface 5 in an assignment view as the default view of the quality center cases and assignments user interface 5. In some other example embodiments, the QC customization module 78 may generate the quality center cases and assignments user interface 5 in response to receipt of an indication of a selection of the assignments view tab 4.

Referring now to FIG. 5, a diagram illustrating a quality center cases and assignments user interface in a cases view is provided according to an example embodiment. In the example embodiment of FIG. 5, the QC customization module 78 may generate the quality center cases and assignments user interface 7 in the cases view in response to receipt of an indication of a selection of the cases view tab 6. The QC customization module 78 may provide visible indicia in the quality center cases and assignments user interface 7 in the cases view, for display, in response to retrieving test cases designated (e.g., previously designated) and stored in the database 87. By analyzing data in the database 87 associated with the test cases, the QC customization module 78 may determine whether the test cases are approved and may determine an estimated duration of time for completion of a test(s) associated with one or more corresponding test cases. In this regard, in the example embodiment of FIG. 5, the QC customization module 78 may indicate in the quality center cases and assignments user interface 7 in the cases view that the test cases are approved and determines estimated durations of time (e.g., 3 minutes, 20 minutes, 10 minutes, 68 minutes, etc.) for completion of tests associated with test cases (e.g., test case numbers 1, 2, 3 and 4).

In the example embodiment of FIG. 5, the QC customization module 78 may filter and sort test cases from the cases view of the quality center cases and assignments user interface 7. The QC customization module 78 may filter a test case grid of the quality center cases and assignments user interface 7 in response to receipt of one or more indications of selections of data from groups, accessible via a tab, folder, pull down menu or the like, including but not limited to category, suite, execution type, execution priority, initiative, product, test case (TC) status, created by, assignable, automation and origin.

In response to receipt of an indication of a selection of the category group, the QC customization module 78 may list all top level folder names entered in a test plan module (e.g., a quality center test plan module (e.g., in a tree view)).

Additionally, after the category group is selected and in response to receipt of an indication of a selection of the suite group, the QC customization module 78 may display indication of a suite(s) associated with the selected category. In response to receipt of an indication of a selection of the execution type (also referred to herein as exec type) group, the QC customization module 78 may indicate values for execution types corresponding to test cases such as, for example, all new functionality, other, regression, smoke test, etc.

Moreover, in response to receipt of an indication of a selection of the execution priority (also referred to herein as exec priority) group, the QC customization module 78 may indicate values for execution priorities corresponding to test cases such as, for example, all, none, primary, secondary, etc. Further, in an instance in which the QC customization module 78 detects receipt of an indication of the initiative group, the QC customization module 78 may identify or list all business initiatives entered and stored in the quality center database 87. Additionally, in an instance in which the QC customization module 78 detects receipt of an indication of the product group, the QC customization module 78 may identify or list all product versions entered and stored in the quality center database 87.

In an instance in which the QC customization module 78 detects receipt of an indication of the test case status group, the QC customization module 78 may identify or list all possible test case status states in accordance with a quality assurance (QA) standard. In an example embodiment, values of the test case status states may include but are not limited to all, approved (e.g., only approved test cases may be assigned to a test cycle), draft, review, revise, etc.

In response to receipt of an indication of a selection of the created by group, the QC customization module 78 may indicate or list user identifiers (IDs) associated with corresponding users that wrote test cases. Additionally, in response to receipt of an indication of a selection of the assignable group, the QC customization module 78 may designate respective test cases with values such as, for example, all (e.g., denotes indication of all tests cases irrespective of whether the test cases are designated as capable of being assigned to a test case or blocked from being assigned to a test case), yes (e.g., denotes that a corresponding test case may be assigned to a test cycle), and no (e.g., denotes that a corresponding test case is blocked from being assigned to a test cycle). Furthermore, in response to receipt of an indication of a selection of the automation group, the QC customization module 78 may designate respective test cases with values such as, for example, all (e.g., denotes indication of all test cases irrespective of whether the tests cases are performed manually or automatically), full (e.g., denotes indication of test cases that are automated or performed entirely in an automated manner), none (e.g., denotes indication of test cases that are performed manually and are not performed in an automated manner) and partial (e.g., denotes indication of test cases in which a portion of the test cases are automated or performed in an automated manner whereas other portions of the test cases are performed manually).

In response to receipt of an indication of a selection of the origin group, the QC customization module 78 may generate a free form text field for entering of search criteria to find origin country data.

Referring now to FIG. 6, a diagram illustrating a quality center cases and assignments user interface for selecting one or more test cases is provided according to an exemplary embodiment. The QC customization module 78 may enable selection of one or more groups and options to sort in response to receipt of an indication of a filter cases tab 9. In the example embodiment of FIG. 6, in response to detecting indications of selections of the category, suite, assignable and automation groups, the QC customization module 78 may generate the quality center cases and assignments user interface 8 including visible indicia indicating test cases that are designated as assignable and may indicate test cases (e.g., all assignable test cases) that are designated as being performed automatically, performed manually and/or performed partially automatically and partially manually.

In this regard, corresponding test cases may be displayed in the quality center cases and assignments user interface 8, via a display (e.g., display 80) based on the categories and options selected. The QC customization module 78 may clear the filter and display all test cases in the quality center cases and assignments user interface 8 in response to receiving an indication of a selection of the remove filters tab 11.

In the example embodiment of FIG. 6, the QC customization module 78 may sort test cases in the Quality Center cases and assignments user interface 8 in response to receipt of an indication of a selection(s) of a heading of a column to be sorted including, but not limited to, test case number, name (e.g., name of a test case(s)), estimated duration, country of origin, active, etc.

Referring now to FIG. 7, a diagram illustrating a quality center cases and assignments user interface for assigning test cases is provided according to an exemplary embodiment. In the example embodiment of FIG. 7, the QC customization module 78 may highlight test cases in the quality center cases and assignments user interface 10 in response to receiving indications of selections (e.g., by a user) of test cases that are designated to be assigned for execution of one or more corresponding applications. In the example embodiment of FIG. 7, the QC customization module 78 detected selections of test cases associated with test case numbers 889, 1161, 2654, 3212, and 12223 for assignment and execution of one or more corresponding applications.

In response to detecting selected test cases for assignment and execution of applications, the QC customization module 78 may automatically calculate and provide visible indicia 12 in the quality center cases and assignments user interface 10 indicating the selected count of test cases (e.g., 5 test cases) and the total estimated duration of time (e.g., 1 hour and 6 minutes (e.g., 10 minutes, 8 minutes, 15 minutes, 10 minutes, and 23 minutes corresponding to test case numbers 889, 1161, 2654, 3212, and 12223, respectively)) in which to perform the selected test cases.

Referring now to FIG. 8, a diagram illustrating a quality center cases and assignments user interface for creating assignments is provided according to an exemplary embodiment. In the example embodiment of FIG. 8, the QC customization module 78 may generate visible indicia 15 in the quality center cases and assignments user interface 14 indicating options (e.g., a create assignment link 16, an update test link 1) to create assignments and update tests in response to receipt of an indication of a selection or a detection of a click in the quality center cases and assignments user interface 14.

Referring now to FIGS. 9A and 9B, diagrams illustrating tables for list boxes and command buttons of a create assignments dialog is provided according to an exemplary embodiment. In response to receipt of an indication of a selection of the create assignment option of the visible indicia 15, the QC customization module 78 may generate and display (e.g., via display 80) a create assignments dialog (e.g., create assignments dialog 19 of FIG. 10) including a list box and command buttons.

FIG. 9A shows a table 17 indicating list box names and corresponding descriptions associated with creating assignments. The list box names include test cycle, assigned to, operation system (OS), application language, OS language, and origin country. The test cycle name is associated with a description relating to the corresponding test cycle in which the assignments are being created. The assigned to name is associated with a description relating to an indication of a tester identifier (ID) in which the created assignments are being assigned. The operating system name is associated with a description relating to the operating system in which the test cases are designated to be run or executed. The application language name is associated with a description relating to an indication of the application language (e.g., English, Spanish, etc.) of a corresponding application in which the test cases are designated to be run or executed. The operating system language name is associated with a description relating to an indication of the operating system language (e.g., Windows™ XP) in which the test cases are designated to be run or executed and the origin country name is associated with a description relating to an indication of the origin country (e.g., United States) in which the test cases are designated to be run or executed.

FIG. 9B shows a table 18 indicating command buttons of the create assignments dialog. In the example embodiment of FIG. 9B, table 18 indicates three command buttons with command names cancel, reset and create assignments. The cancel command button is utilized for closing a create assignments dialog without making any changes. The reset command button is utilized for clearing any selections made in the create assignments dialog. In addition, the create assignments command button is utilized for creating the assignments and sending data to a pending assignments grid.

Referring to FIG. 10, a diagram illustrating a create assignments dialog is provided according to an exemplary embodiment. In the example embodiment of FIG. 10, the QC customization module 78 may generate the create assignment dialog 19 in response to receipt of an indication of a selection of the create assignments option (e.g., a create assignment link) of the visible indicia 15 of the quality center cases and assignments user interface 14. The create assignment dialog 19 may include a test cycle field, an assigned to field, an operating system field, an application language field, and an operating system (OS) field. In an alternative example embodiment, the create assignment dialog 19 may also include an origin country field. The QC customization module 78 may detect selections in each of the fields in order to create an assignment(s) of test cases for execution of one or more applications, as described more fully below.

Referring now to FIG. 11, a diagram illustrating a user interface for selecting options to create assignments is provided according to an exemplary embodiment. In response to receiving an indication of a selection of test cases from a quality center cases and assignments user interface 20 and an indication of a selection of a create assignments option (e.g., a create assignments link 16) from an item of visible indicia (e.g., visible indicia 15), the QC customization module 78 may generate a create assignments user interface 21. In the example embodiment of FIG. 11, the QC customization module 78 detected indications of selections of the test cycle field (e.g., 17.0 Cycle 1—US), the assigned to field (e.g., User ID ism1rjk), the operating system field (e.g., Windows™ 8), the application language field (e.g., U.S. English) and the operating system language field (e.g., U.S. English).

In addition, in response to detecting the selections of the test cases from the quality center cases and assignments user interface 20, the QC customization module 78 determined that the estimated duration time for completion of the test cases is 2 hours and 1 minute. In this regard, the QC customization module 78 includes visible indicia 26 in the quality center cases and assignments user interface 20 indicating the estimated duration time for completion of the test cases or completion of the testing or execution of functions of an application(s) corresponding to the test cases. The visible indicia 26 denoting the estimated duration of time may enable a determination as to whether the estimated duration of time in which to complete the testing or the execution of the functions of an application(s) occurs during an acceptable time period. For instance, by analyzing the estimated duration of time, a user (e.g., Test Lead) may determine whether the completion of the testing or the execution of the functions of the application(s) occurs during an acceptable time period (e.g., 2.5 hours) in order to keep the assigning of the test cases and testing for a designated test cycle on track. Additionally, by analyzing the estimated duration of time, a user (e.g., Test Lead) may determine whether a tester assigned to the test cases has availability or capacity to properly manage the testing or execution of the functions of the application(s) corresponding to the test cases.

In response to receipt of an indication of a selection of the create assignments command button 22, the QC customization module 78 may move the selected test cases to a pending assignments grid 23 of the quality center cases and assignments user interface 20. In one example embodiment, detection of the selection of the create assignments command button 22 to create the assignments may signify or denote, to the QC customization module 78, that the estimated duration of time occurs during an acceptable time period.

The assignments of test cases are not finalized while in the pending assignments grid 23. For example, in an instance in which the QC customization module 78 detects that the cancel button 24 or exit button 25 is selected, the QC customization module 78 may close the create assignments dialog 21 and no assignments may be made.

Referring now to FIG. 12, a diagram illustrating a pending assignments grid is provided according to an exemplary embodiment. In the example embodiment of FIG. 12, in response to receipt of an indication of a selection (e.g., highlighting and clicking) of a test case(s) from a pending assignments grid 27 (also referred to herein as pending assignments user interface), the QC customization module 78 may generate and provide visible indicia indicating a dialog box 28 with options for the pending assignments. The options may include, but are not limited to, delete pending assignments, clone pending assignments, edit pending assignments, and post selected assignments.

In this regard, selecting the delete pending assignments option may trigger the QC customization module 78 to delete the selected assignment from the pending assignments grid 27. Furthermore, selecting the clone pending assignments option may trigger the QC customization module 78 to facilitate display (e.g., via display 80) of a create assignments dialog (e.g., create assignments dialog 21) to enable assigning of another copy of the test case(s) to another tester and/or scenario.

Moreover, selecting the edit pending assignments option may trigger the QC customization module 78 to display a create assignments dialog (e.g., create assignments dialog 21) to enable changing or correcting of the tester and/or scenario. Selecting of the post selected assignments option may trigger the QC customization module 78 to move a selected test case(s) from a pending assignments grid (e.g., pending assignments grid 27) to a database (e.g., quality center database 87).

In this regard, in response to detecting selection of the post selected assignments option denoting that the selections of the test cases are satisfactory, the QC customization module 78 may generate and display a dialog indicating that "All Pending Assignments will be posted to the database" and asks "Are you sure?" to identify whether a user (e.g., a Test Lead, Tester, etc.) is sure about having the selections of the test cases posted to a database (e.g., quality center database 87). In response to receiving an indication of a selection indicating "No", the QC customization module 78 may close a dialog (e.g., the create assignments dialog) with the assignments still pending. On the other hand, in response to receiving an indication of a selection indicating "Yes", the QC customization module 78 may move the selected test case assignments from a pending assignment grid (e.g., pending assignments grid 27) to a database (e.g., quality center database 87).

Referring now to FIG. 13, a diagram illustrating a quality center test lab execution user interface is provided according to an exemplary embodiment. In the exemplary embodiment of FIG. 13, the QC customization module 78 may generate the Quality Center test lab execution user interface 29 in response to moving selected test cases for assignment and execution of one or more applications from a pending assignments grid (e.g., pending assignments grid 27) to a database (e.g., quality center database 87). In this regard, the QC customization module 78 may provide visible indicia in the Quality Center test lab user interface 29 indicating the name of the selected test cases (e.g., [1] Non-existent name in Address . . . , etc.), the status (e.g., Not Run), the assigned tester (e.g., a test assigned user ID ism1rjk), the test origin (e.g., U.S.), operating system (e.g., Windows™ 8) and any other suitable data.

Referring now to FIG. 14, a diagram illustrating a Quality Center cases and assignments user interface is provided according to an exemplary embodiment. In the example embodiment of the FIG. 14, in response to receipt of an indication of a selection of the assignment view tab 31, the QC customization module 78 may indicate all active test cycles and assigned test cases in the quality center cases and assignments user interface 30 for reassigning of one or more test case assignments. In this regard, the QC customization module 78 may identify one or more test cases to be reassigned in response to receiving indications of selections in response to filtering one or more groups from the quality center cases and assignments user interface 30, including but not limited to, suite, execution type, initiate, product, run status, assigned to (e.g., a user ID corresponding to a user in which the test cases are assigned), cycle and any other suitable groups.

Referring now to FIG. 15, a diagram illustrating a user interface for reassigning one or more test cases is provided according to an example embodiment. In the example embodiment of FIG. 15, in response to receipt of indications of one or more selections of test cases, from the quality center cases and assignments user interface 32, the QC customization module 78 may provide visible indicia (e.g., highlighted data) in the quality center cases and assignment user interface 32 identifying the corresponding test cases to be reassigned.

Referring now to FIG. 16, a diagram illustrating another user interface for reassigning one or more test cases is provided according to an example embodiment. In the example embodiment of FIG. 16, the QC customization module 78 may generate visible indicia such as, for example, a reassign assignments icon 34 in a user interface 33 in response to detecting a selection (e.g., a click) of the selected test cases designated for reassignment.

Referring now to FIG. 17, a diagram illustrating a reassign assignments dialog is provided according to an example embodiment. In the example embodiment of FIG. 17, the QC customization module 78 may generate the reassign assignments dialog 35 in response to detecting an indication of a selection of the reassign assignments icon 34. The QC customization module 78 may generate the reassign assignments dialog 35 with list boxes and command buttons.

The list boxes of the reassign assignments dialog 35 include an application language field, an assigned to field, an operating system field, an operating language field, and an origin country field. The command buttons of the reassign assignments dialog 35 includes a reassign command button, a reset button, and a cancel button. A table 38 indicating the list box names and corresponding descriptions is shown in FIG. 18A. In addition, a table 39 indicating the command button names and corresponding descriptions is shown in FIG. 18B.

The QC customization module 78 may detect one more selections of the fields of the list boxes of the reassign assignments dialog 35. In this regard, the QC customization module 78 may reassign one or more assignments (e.g., previously assigned test cases or at least a subset of previously assigned test cases) in response to detection of a selection of the reassign command button 36. In this regard, the changes to an assignment (e.g., a previously designated assignment) may be made based on the reassigned assignment.

The reassign assignments dialog 35 may remain open until a selection of a close button 37 is detected. In response to detection of a selection of the close button 37, the QC customization module 78 may close the reassign assignment dialog 35 and the changes pertaining to the reassigned assignments may become effective.

Referring now to FIG. 19, a diagram illustrating a user interface and a reassign assignments dialog is provided according to an exemplary embodiment. In the example embodiment of FIG. 19, the QC customization module 78 may detect multiple selections, via the quality center cases and assignments user interface 40, of test cases for reassignment and automatically determines the number of reassigned test cases selected (e.g., 5) and the estimated duration of time in which it takes for completion of testing or execution of functions of an application(s) corresponding to the reassigned test cases (e.g., 2 hours, 1 minute). In this regard, the QC customization module 78 may provide visible indicia 42 in the quality center cases and assignments user interface 40 indicating the total number of test cases selected for reassignment and the estimated duration of time for completion of the test cases selected for reassignment.

In response to receipt of an indication of a reassign assignments icon (e.g., reassign assignments icon 34), the QC customization module 78 may launch the reassign assignments dialog 41 and may indicate detected selections in the application language field (e.g., Japanese), the assigned to field (e.g., user ID btt5ioa), the operating system field (e.g., Vista), the operating system language field (e.g., Russian) and the origin country field, as shown in FIG. 19. In response to receipt of an indication of a selection of the reassigned command button 43, the QC customization module 78 may reassign the selected test cases for execution.

The QC customization module 78 may also identify or locate duplicate assignments in a same or different test cycle(s). For instance, the QC customization module 78 may determine whether an assignment has a test instance greater than 1 (e.g., 2 test instances) which denotes that the corresponding test case has been assigned more than once.

Referring now to FIG. 20, a diagram illustrating time saving gains is provided according to an exemplary embodiment. As shown in FIG. 20, by utilizing the QC customization module 78, the exemplary embodiments may create test case execution assignments (e.g., for an average of 1,200-1,300 test cases) per cycle in less time (e.g., 4-5 days) than existing/conventional test case management applications (e.g., 8-10 days) resulting in time saved (e.g., 4-5 days). Additionally, by utilizing the QC customization module 78, the exemplary embodiments may reassign test case execution assignments to another resource (e.g., for an average 5 times per cycle) per cycle in less time (e.g., 1 minutes (per request)×5=5 minutes) than existing/conventional test case management applications (e.g., 10 minutes (per request)×5=50 minutes) resulting in time saved (e.g., 45 minutes (e.g., 90% effort reduced)).

Furthermore, by utilizing the QC customization module 78, the exemplary embodiments may identify or locate duplicate assignments in a same or different test cycle(s) after all cycle assignments are completed in less time (e.g., 10-15 minutes) than existing/conventional test case management applications (e.g., 2-3 hours) resulting in time saved (e.g., 2 or more hours).

Referring now to FIG. 21, a flowchart of an example method for facilitating bulk assignment of test cases to a test cycle is provided according to an exemplary embodiment. At operation 2100, an apparatus (e.g., communication device 145) may enable selection, via a user interface (e.g., quality center cases and assignments user interface 23), of a plurality of test cases (e.g., test case numbers 1, 3, 4, 5, 6 of FIG. 11) to assign the test cases to a designated test cycle (e.g., test cycle 17.0 Cycle 1—US). The test cases may be designated for testing or execution of one or more functions of at least one application. At operation 2105, the apparatus (e.g., communication device 145) may automatically calculate an estimated duration of time (e.g., 2 hours and 1 minute) in which to complete the testing or the execution of the functions in response to receipt of indications of selections of the test cases via the user interface (e.g., quality center cases and assignments user interface 23). At operation 2110, the apparatus (e.g., communication device 145) may provide visible indicia (e.g., visible indicia 26) in the user interface (e.g., quality center cases and assignments user interface 23) indicating the estimated duration of time in which to complete the testing or the execution of the functions of the application (e.g., corresponding to the test cases).

It should be pointed out that FIG. 21 is a flowchart of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86) and executed by a processor (e.g., processor 70, QC customization module 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIG. 21 above may comprise a processor (e.g., the processor 70, the QC customization module 78) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 70 (e.g., as means for performing any of the operations described above), the QC customization module 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    enabling selection, via a user interface, of a plurality of test cases to assign the test cases to a designated test cycle, the test cases are designated for testing or execution of one or more functions of at least one application;
    automatically calculating, via a processor, an estimated duration of time in which to complete the testing or the execution of the functions in response to receipt of indications of selections of the test cases via the user interface;
    providing visible indicia in the user interface indicating the estimated duration of time in which to complete the testing or the execution of the functions of the application; and
    determining whether the estimated duration of time in which to complete the testing or the execution of the functions of the application occurs during an acceptable time period.

2. The method of claim 1, wherein providing visible indicia in the user interface further comprises providing visible data in the user interface indicating a total number of the selected test cases.

3. The method of claim 1, further comprising:
    assigning the test cases to the designated test cycle in response to detecting an indication of a selection to create assignments of the test cases, the selection to create the assignments denotes that the estimated duration of time occurs during an acceptable time period.

4. The method of claim 3, further comprising:
    assigning a user to manage the testing or the execution of the functions of the application in response to detecting an indication of a selection of an identifier of the user.

5. The method of claim 1, further comprising:
    enabling analyzing of the visible indicia indicating the estimated duration of time in which to complete the testing or the execution to facilitate determining whether a selected user has capacity to manage the testing or the execution of the functions of the application.

6. The method of claim 1, further comprising:
    reassigning multiple test cases to a selected test cycle in response to detecting selection of at least a subset of the test cases and other test cases.

7. The method of claim 6, wherein reassigning further comprises designating a user to manage testing or execution of functions of the application corresponding to the multiple tests in response to detection of a selection of an indication of the user.

8. The method of claim 6, further comprising:
    calculating another estimated duration of time in which to complete testing or execution of functions of the application corresponding to the multiple test cases; and
    providing visible indicia in the user interface indicating the another estimated duration of time.

9. An apparatus comprising at least one processor and at least one memory including computer program code, the at least one memory and the computer program code configured to, with the processor, cause the apparatus to at least:
    enable selection, via a user interface, of a plurality of test cases to assign the test cases to a designated test cycle, the test cases are designated for testing or execution of one or more functions of at least one application;
    automatically calculate an estimated duration of time in which to complete the testing or the execution of the functions in response to receipt of indications of selections of the test cases via the user interface;
    provide visible indicia in the user interface indicating the estimated duration of time in which to complete the testing or the execution of the functions of the application; and
    determine whether the estimated duration of time in which to complete the testing or the execution of the functions of the application occurs during an acceptable time period.

10. The apparatus of claim 9, wherein the memory and computer program code are further configured to, with the processor, cause the apparatus to:
    provide visible indicia in the user interface by providing visible data in the user interface indicating a total number of the selected test cases.

11. The apparatus of claim 9, wherein the memory and computer program code are further configured to, with the processor, cause the apparatus to:
    assign the test cases to the designated test cycle in response to detecting an indication of a selection to create assignments of the test cases, the selection to create the assignments denotes that the estimated duration of time occurs during an acceptable time period.

12. The apparatus of claim 11, wherein the memory and computer program code are further configured to, with the processor, cause the apparatus to:
    assign a user to manage the testing or the execution of the functions of the application in response to detecting an indication of a selection of an identifier of the user.

13. The apparatus of claim 9, wherein the memory and computer program code are further configured to, with the processor, cause the apparatus to:
    enable analyzing of the visible indicia indicating the estimated duration of time in which to complete the testing or the execution to facilitate a determination of whether a selected user has capacity to manage the testing or the execution of the functions of the application.

14. The apparatus of claim 9, wherein the memory and computer program code are further configured to, with the processor, cause the apparatus to:
    reassign multiple test cases to a selected test cycle in response to detecting selection of at least a subset of the test cases and other test cases.

15. The apparatus of claim 14, wherein the memory and computer program code are further configured to, with the processor, cause the apparatus to:
    reassign the multiple test cases by designating a user to manage testing or execution of functions of the application corresponding to the multiple tests in response to detection of a selection of an indication of the user.

16. The apparatus of claim 14, wherein the memory and computer program code are further configured to, with the processor, cause the apparatus to:
    calculate another estimated duration of time in which to complete testing or execution of functions of the application corresponding to the multiple test cases; and
    provide visible indicia in the user interface indicating the another estimated duration of time.

17. A computer program product comprising at least one non-transitory computer-readable storage medium having computer-readable program code portions stored therein, the computer-readable program code portions comprising:

program code instructions configured to enable selection, via a user interface, of a plurality of test cases to assign the test cases to a designated test cycle, the test cases are designated for testing or execution of one or more functions of at least one application;

program code instructions configured to automatically calculate an estimated duration of time in which to complete the testing or the execution of the functions in response to receipt of indications of selections of the test cases via the user interface;

program code instructions configured to provide visible indicia in the user interface indicating the estimated duration of time in which to complete the testing or the execution of the functions of the application; and program code instructions configured to determine whether the estimated duration of time in which to complete the testing or the execution of the functions of the application occurs during an acceptable time period.

18. The computer program product of claim 17, wherein providing visible indicia in the user interface further comprises providing visible data in the user interface indicating a total number of the selected test cases.

\* \* \* \* \*